July 4, 1972      N. U. LALIBERTE      3,674,587

PRODUCING POLARIZING OPTICAL DEVICES AND PRODUCT THEREOF

Filed May 6, 1970      2 Sheets-Sheet 1

INVENTOR.
NORMAN. U. LALIBERTE

BY William C. Nolan

ATTORNEY

*INVENTOR.*
NORMAN U. LALIBERTE

BY
ATTORNEY

United States Patent Office 3,674,587
Patented July 4, 1972

3,674,587
PRODUCING POLARIZING OPTICAL DEVICES AND PRODUCT THEREOF
Norman U. La Liberte, Woodstock, Conn., assignor to American Optical Corporation, Southbridge, Mass.
Filed May 6, 1970, Ser. No. 35,132
Int. Cl. B29f 1/10; B32b 27/04; B29c 6/00
U.S. Cl. 156—245
7 Claims

ABSTRACT OF THE DISCLOSURE

A laminated optical element is produced by prepositioning a polarizing sheet, which has been coated on both sides with adhesive compatible with the encasing material, in a mold so as to accurately space the polarizing sheet from the inner mold surfaces, injecting a monomer of allyl diglycol carbonate into the mold so as to completely encase the polarizing sheet, and then curing the laminate. The process includes producing stress free castings capable of being subjected to subsequent color accepting treatment and various finishing processes. The laminated product provides a fully encased polarizing sheet with a thin layer of uniform thickness of the polymer on the front side of the polarizing sheet which may be readily finished for optical devices.

Various types of laminated polarizing optics have been proposed in the prior art, these, however, were normally formed of three individual sheets, usually with two optical sheets sandwiched over a polarizing sheet. In other instances, only two sheets were used with a polarizing sheet cemented to an optically clear sheet which leaves the polarizing sheet exposed. A very common type of laminate utilized two sheets of glass laminated with a polarizing sheet therebetween. The polarizing sheet is a polymer such as oriented polyvinylene in molecularly oriented polyvinyl alcohol or polyvinyl butyral, or oriented polyvinyl alcohol dyed or stained with a solution to form in the sheet an oriented dichroic complex. A difficult problem of adhesion of the polarizing sheet to the covering optical sheets is produced by the attempted lamination. One major problem with previous laminates is separation if the optical device is further processed as by being immersed in a hot solvent for an extended period of time for surface dyeing the optical device to reduce visual transmittance, as is desirable in certain types of sunglasses. The prepared laminated polarizing optics are usually fabricated at a central plant, and are therefore subject to storage and shipment to points of use. The optics may, also, be subjected to further treatment, such as grinding, polishing, mounting, etc., all of which may result in defects in the laminates particularly separation, some fragmentation and sheet split. Storage conditions, also, have caused defects which may include chemical changes and deterioration of the polymer or adhesives.

A principle object of the invention is to provide a process for producing a cast, light polarizer wherein a polarizing sheet is embedded in a polymer.

Another object of the invention is to provide an improved light polarizer which comprises a sheet of light polarizing material bonded to and embedded in a cast polymer.

Another object of the invention is to provide an improved process for embedding a polarizing sheet in a cast polymer which is cured in situ around said polarizing sheet, and providing good adhesion between the polymer and the polarizing sheet.

An additional object of the invention is to provide a process for accurately locating a polarizing sheet in a cast polymer, with the polarizing sheet in close proximity to the front of a cast optical element, but remaining completely embedded within the casting.

Another object of the invention is to provide a process and apparatus for accurately positioning a polarizing sheet in a cast polymer, so that the polarizing sheet is accuratly positioned in the cast polymer without distortion.

A still further object of the invention is to provide an improved process for producing a polarizing sheet in a cast polymer which includes accurately positioning a polarizing sheet in a mold, filling the mold with a liquid monomer which flows on the front and the back of the polarizing sheet, and then curing the monomer to produce a laminated polarizing optic.

Yet another object of the invention is to provide a polarizing sheet in a cast optical element in which the monomer embedding a polarizing sheet adheres both to the convex and concave mold surfaces throughout the curing cycle, but releases when the curing cycle is completed.

These and other objects and advantages of the invention may be readily ascertained by referring to the following description and appended illustrations in which.

Figure 13:
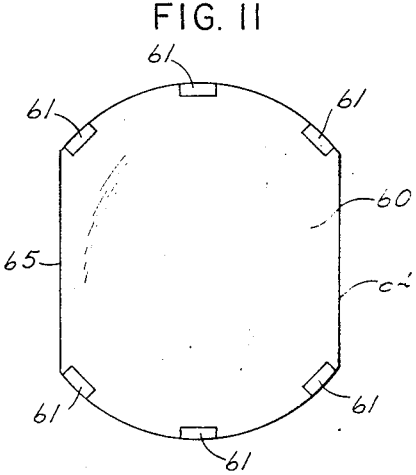
Figure 14:
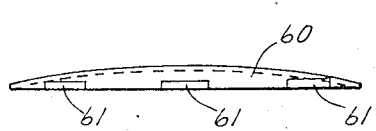

FIGS. 7–12 inclusive, illustrate various means for orienting a polarizing sheet in a mold and providing communication between the front and rear of a polarizing sheet mounted in a mold, permitting liquid monomer to completely encase the polarizing sheet and permit the exhaust of air bubbles from both sides of the polarizing sheet;

FIG. 13 is a top plan view of a modified form of polarizing sheet for positioning the same in a mold; and FIG. 14 is a side elevational view of the polarizing sheet of FIG. 13.

According to the present invention there is provided a polarizing element which consists of a cast lens element having embedded therein a polarizing sheet positioned near the front of the lens and coated on the front of the sheet with a uniform thickness of the resultant polymer. The polarizing sheet is initially coated with a substance which provides good adhesion between the resultant cast polymer and the polarizing sheet. In a preferred form, a polymer called CR-39 formed from a liquid monomer (diethylene glycol bis (allyl carbonate)) or allyl diglycol carbonate, is cast around a polarizing sheet which has been coated with an adhesive, preferably polyvinyl butyral or other composition which provides good adhesion between the polarizing sheet and the resultant polymer. The polarizing sheet must be positioned near the front of the resultant cast polymer, but the polarizing sheet must be covered by at least a film of the polymer which prevents chemical attack or physical abuse of the polarizing sheet. The positioning of the sheet in the laminate must, however, be accurately controlled since if the polarizing sheet is not close to the front surface of the polymer, a problem develops which destroys or partly destroys the polarizing effect of the sheet. This is because the polymer, under stress, becomes birefringent, and if insufficient material thickness is in front of the polarizing sheet the axis of the polarization is rotated. The extent to which it is rotated depends on the thickness of the polymer and the amount of stress.

Another problem overcome by the present process is to hold the polarizing sheet or film so that it is accurately held but not distorted. Since the polarizing sheet must cover the major part of the lens, the polarizing sheet covers a major portion of the cross-section of the mold in which it is cast. Means are provided for a single injection of liquid monomer into the mold and to have the liquid flow under the plasticizing sheet, permitting air to exhaust from under the sheet, and then filling the remainder of the mold with the monomer. The means for holding the polarizing sheet permits easy filling of the mold, and holds the polarizing film free from stress during curing.

Figure 1:
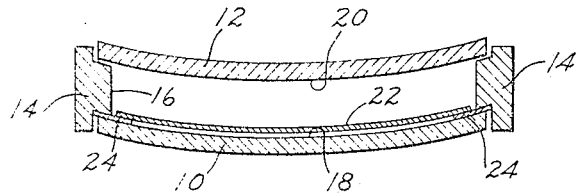
FIG. 1 is a side elevation, in cross-section, of a mold for forming a polarizing optical element according to the present invention.

One form of mold for forming a light polarizing spectacle or other type of lens is shown in FIG. 1, wherein two glass mold elements 10 and 12 are arranged to be spaced apart by a peripheral gasket 14, provided with an internal flange 16 spacing the two glass elements apart the thickness of the desired lens. The glass element 10 is concave providing a smooth surface 18 against which a polymer is formed thereby producing a smooth surface of a subsequently formed lens. The glass element 12 has a convex surface 20 which likewise is smooth for forming the inside of a lens. The distances apart of the elements are shown somewhat exaggerated for illustration purposes. A polarizing sheet 22 is supported on tabs 24 which rest on the glass element 10 and space the polarizing sheet 22 a predetermined distance from the surface 18 of the glass element 10. In one form, the casting was a 53 mm. round disc and the six spacers provided good aligning results. The polarizing disc is slightly smaller than the inside dimension of the gasket which allows a liquid monomer charged into the upper space to flow around the sheet into the space between the polarizing sheet 22 and the glass element 10 and permits air to exhaust therefrom. The spacers 24 are small pieces of the same material as the polarizing sheet or disc and these are secured to the polarizing disc by dipping the tabs in acetone and touching these to the edge of the disc. This cements the tabs to the disc. The tabs rest on the surface 18 and space the disc from the surface 18, but permit the liquid monomer to flow under the disc and air bubbles to be released from beneath the disc 22. The liquid monomer is CR–39 (allyl diglycol carbonate) and when mixed with a peroxide catalyst, the liquid monomer is ready for curing at relatively low temperatures in an oven. By providing the disc 22 with the same radius of curvature as the inside surface 18, the tabs 24 hold the disc so as to provide a uniform thickness of from ¼ to 1½ mm. of the polymer on the front of the polarizing disc.

Prior to placing the polarizing disc in the mold it is coated with polyvinyl butyral. The polyvinyl butyral is in solution in a solvent for the same, and the polarizing disc dipped into the solution providing a coating on the polarizing sheet.

It is important that the polarizing sheet be maintained as close as possible to the front surface of the resultant lens, while remaining completely encased in the lens material. The polarizing sheet is soft and subject to scratching and/or chemical attack. The casting material is, however, hard and quite resistant to physical abuse and/or chemical attack. The thickness of the casting material in front of the polarizing sheet, however, may affect the polarizing effect of the polarizing sheet. The CR–39 polymer, under stress, becomes birefringent and if there is any material thickness of the polymer in front of the polarizing sheet, the axis of polarization of the sheet will be rotated. While it is possible to produce relatively stress free castings, stresses can develop during finishing or when the finished lens is mounted in a frame. Primarily for this reason the polarizing film should be kept close to the front surface of the lens and be covered by a uniform thickness of the polymer.

Figure 2:
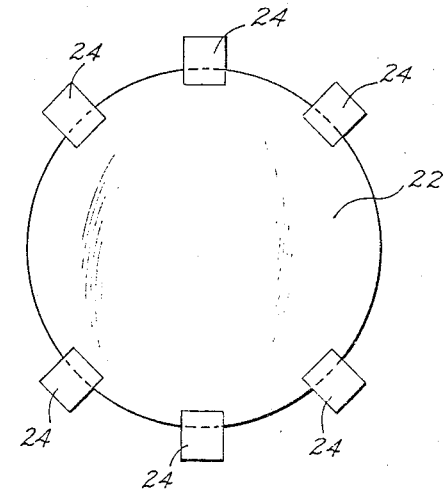
FIG. 2 is a top plan of one form of a polarizing sheet arranged for placement in a mold for embedding in a polymer.
Figure 3:
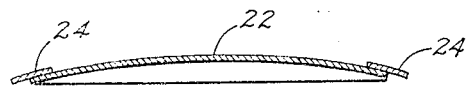
FIG. 3 is a side elevational view of the polarizing sheet in FIG. 2.
Figure 4:
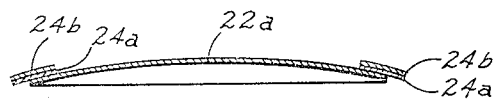
FIG. 4 is side elevational view of a slightly modified polarizing sheet according to the invention, illustrating a means for adjusting the position of the polarizing sheet in a mold.

The axis of polarization of the sheet in relation to the casting must be accurately maintained to prevent distortion and failure of polarization of the light. The tabs 24, when in known alignment on the sheet, provide means for accurately positioning the polarizing sheet 22 in the mold. Alignment is, also, very important when prescription lenses are required. Grinding of the prescription surfaces in many cases is critical with the alignment of the polarizing sheet.

Where it is desired to have a slightly thicker film of casting material over the polarizing sheet, a double thickness of tabs may be provided, a shown in FIG. 3, where a polarizing sheet 22a is provided with a series of tabs 24a, in a similar arrangement to that shown in FIG. 2. An extra tab is then cemented to the top of each tab 24a to provide a double thickness of tab, and thereby providing a double thickness of the polymer over the polarizing sheet 22a. Various thicknesses of tabs may be used, or various numbers of the tabs superimposed over each other to vary the thickness.

Figure 5:
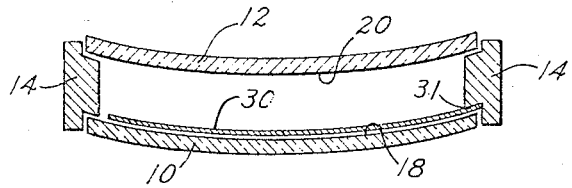
FIG. 5 is a side elevation, in cross-section, of a mold showing a modified polarizing sheet holding means.
Figure 6:
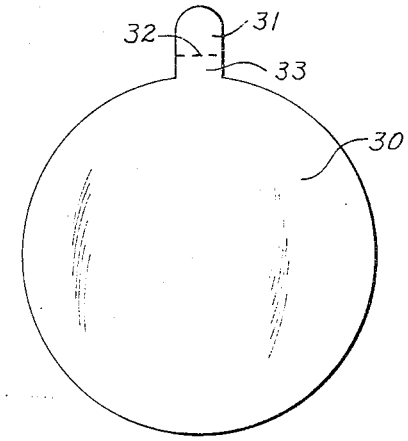
FIG. 6 is a top plan view of a form of a polarizing sheet for use in the mold of FIG. 5.

A modified means of holding a polarizing disc in a mold is illustrated in FIG. 5, where a disc of polarizing material 30 is provided with a single tab 31. For placing the disc in the mold, the tab 31 is cut along cut line 32 leaving a short tab 33 which seats under the gasket 14 and the glass member 10. The disc 30 is of smaller dimensions than the internal dimension of the gasket 14 so that the resin flows freely under the polarizing sheet 30 completely filling the space thereunder and permitting air to pass out from beneath the polarizing disc. The tab may be made of various thicknesses spacing the disc from the mold surface. The thickness may be varied by cementing portions on the tab.

A series of lenses were produced using the two systems described above, with the CR–39 resin and BP (benzoyl peroxide) catalyst for the polymer. Several of the lenses were molded in SAP molds, and some lenses were produced as plus prescription using a copolymer of CR–39 and methyl methacrylate. The lenses were edged and set in frames. Several prescription lenses were made using the CR–39 polymer, wherein one set of lenses was made RE +50 and LE +50. Another lens set was made RE −125 and LE −125. Several sets of lenses were made plano. The copolymer, described above, is formed of a 70–30 mixture being 70 parts CR–39 and 30 parts methyl methacrylate with 3% peroxide catalyst. The range may extend from 50–90 parts of CR–39 and 50–10 parts of methyl methacrylate. The catalyst is used in conventional quantities.

The polarizing sheet used for the lenses was produced by the Polaroid Company, and was of green color. The visual transmittance of the polarizing sheet was approximately 26%.

Figure 7:
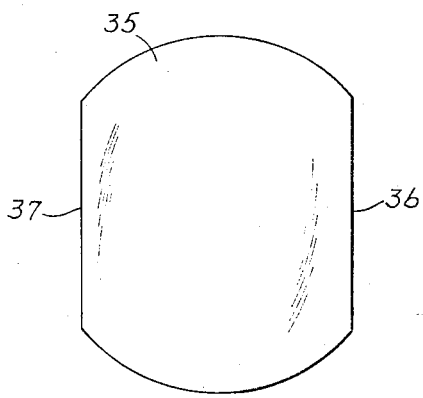

In producing prescrpition lenses, the axis of polarization of the polarizing sheet must be carefully oriented in the lens polymer which encases the polarizing sheet. One means of providing accurate orientation of the axis of polarization of the polarizing sheet is shown in FIG. 7, wherein a polarizing sheet 35, which was a 53 mm. round disc, has cords cut along the disc in alignment with the axis of polarization to provide straight edges 36 and 37 which are aligned with the axis of polarization. This polarizing sheet may be placed in a mold using a shim, in the form of an annular gasket, shown in FIG. 8, formed of Tygon, vinyl resin or Geon as a spacer. The thickness of the shim may vary from 1/4 to 1 1/4 mm. and preferably in the range of 1/2 mm. thickness. This arrangement permits the monomer to be poured into the mold and flow under the polarizing sheet 35 in the space between the edges 36 and 37 and the gasket 38.

Figure 8:
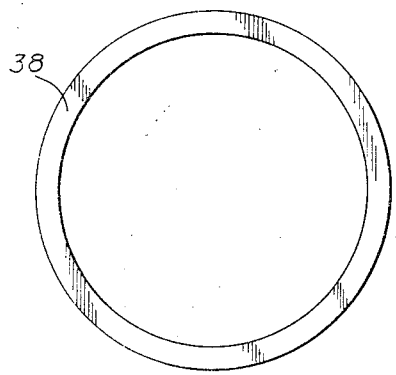
Figure 9:
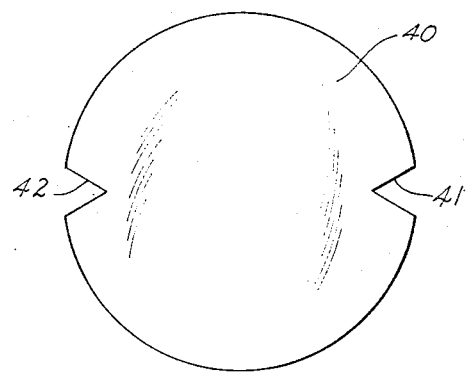
Figure 10:
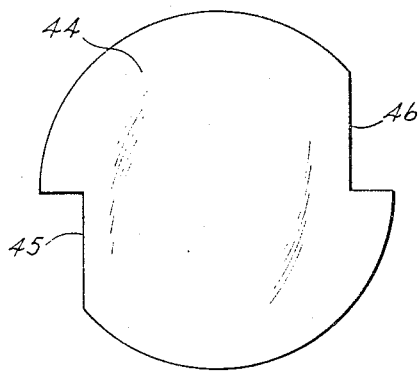
Figure 11:
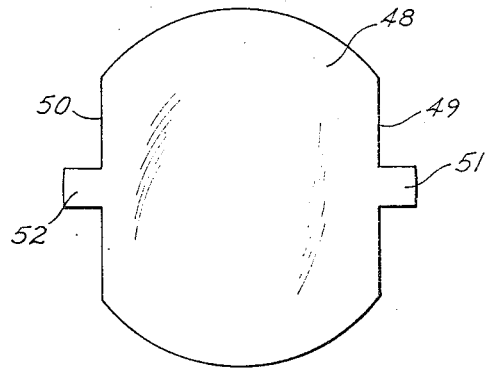
Figure 12:
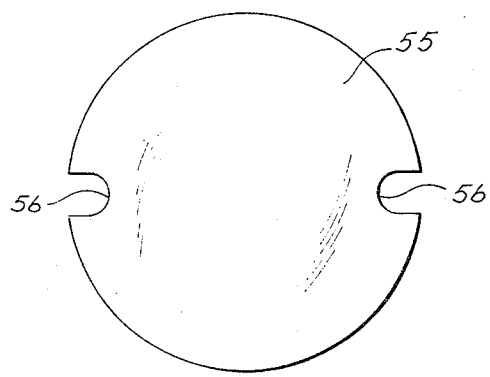

Various other shapes of polarizing disc are illustrated in FIGS. 9 through 13 for permitting the disc to be accurately positioned in the mold, and to permit the monomer to flow underneath the disc in the mold. In FIG. 9 a disc 40 has triangular shaped notches 41 and 42 cut from the sides thereof. The notches provide means for aligning the axis of polarization with the mold and also to permit monomer to flow underneath the disc when the disc is placed on a gasket such as shown in FIG. 8. A modified form of disc is shown in FIG. 10, where a disc 44 has elongated notches 45 and 46 cut from the edges which likewise permits aligning the polarizing disc in the mold and flowing of liquid monomer. The opposed edges of the disc may be formed with tabs, shown in FIG. 11, where a disc 48 has its edges 49 and 50 cut in such a manner as to leave tabs 51 and 52 extending generally along the diameter of the disc. The tabs provide easy means for aligning the disc in the mold. In a similar fashion a disc 55 is provided with circular notches 56 cut in the disc along a diameter for the aligning of the disc in the mold.

The discs may be provided with the attached tabs, or they may be used with a gasket as pointed out above. The use of a formed disc with the tabs as shown in FIGS. 13 and 14 wherein a disc 60 is provided with edge tabs 61 uniformly spaced across the disc from each other and spaced from cut edges 64 and 65 which are parallel to each other cutting a cord off the disc. The tabs are of a similar material to the polarizing disc and there are cemented in place on the disc and provide a spacer for the disc from the mold surface. The thickness of the tab may be from 1/4 to 1 1/4 mm. thick. Also, it was found that six spacers give excellent results in aligning. The formed edges, also, permit a free flow of the polymer under the polarizing sheet 60.

The monomer may be colored so as to provide darkened lenses, or the polymer blank may be immersed in a hot dye solution to surface dye the lens, according to conventional practice, and thereby provide a darkened lens.

Lens blanks were formed in a mold with the embedded polarizing plastic in CR-31 polymer having D and S bifocal segments, and prescription lenses were ground from these blanks. An aspheric cataract blank was cast with the polarizing sheet embedded in it and it was found to be very satisfactory.

The tabs 2, FIG. 2, for a 53 mm. round disc, in one lens set were made 10 mm. by a 3 to 5 mm. wide. In this size there was no buckling of the polarizing film in the cured polymer. The polyvinyl butyral cements (i.e. it bonds) the imbedded polarizing film to the polymer very well. Other lenses were produced using a 65 mm. polarizing disc, and the shims made as an annulus position the polarizing disc very well in the molds. With the various cuts in the polarizing film, there is a free flow of monomer over both sides of the film, and air escapes from at least one of the notches, leaving no trapped air in the blank and the whole blank is cast in a single operation.

The shims shown in FIG. 8 may be made of vinyl resin or Tygon rings about 2 5/8 inches by 2 3/8 inches, and in thickness of 1/4, 1/2 and 1 mm. thick.

In one test, blanks cast with the polarizing disc in blank form caused the front curve of the blank to be 17/100 D strong. There is no asphericity found in these blanks.

Humidity tests conducted on the cast, finished and edged lenses, showed no effect on the lens or on a blank. Cast and ground lenses were satisfactorily dyed in hot aqueous dye solution. No migration of the plasticizer in edged, completed lenses was found when the lenses were tested in acetate frames.

Numerous lenses made of CR-39 polymer were plano or ground and were found satisfactory as light polarizing lenses. Some typical lenses are:

| Lens No.: | Type and grind |
|---|---|
| 1 | R.E. +1.50; L.E. 1.50. |
| 2 | Plano. |
| 3 | R.E. +1.25; L.E. −1.25. |
| 4 | Plano. |
| 5 | R.E. −0.75 (0.50 x 80); L.E. −1.00 (−0.50 x 15). |

NOTE.—R.E.=right eye, L.E.=left eye.

The polarizing sheeting useful in the process can be a green of the type often seen in sunglasses. The CR-39 polymer or the copolymer with methyl methacrylate produces a good covering material for the polarizing film and is readily finished or optically modified as desired. The polyvinyl butyral forms an excellent bond permitting edging and finishing of the lens without damage to the polarizing film. The use of the polyvinyl butyral does not affect the optical quality of the laminations. Multiple laminations may be produced if desired, where one or more films may be laminated to end within the polymer. Various plasticizers, hardeners or initiators may be used with the CR-39. The peroxide initiators with the CR-39 produces clear castings, having a high heat distortion temperature and good optical qualities. The cure is relatively slow (1-24 hours) and is conducted at relatively low temperatures (30°-100° C.) depending on the type of peroxide initiator. The resultant blanks or lenses have a long shelf life and are stable under various climatic conditions.

While the invention has been described by specific examples, particularly with regard to the allyl diglycol carbonate polymer, other polymers may be used which are optically clear in polymerized form and which are compatible with the adhesive coating on the polarizing films to produce a good bond between the polymer and the polarizing film, including other allyl esters forming fluid, soluble, partial polymers, which may be converted into hard, thermoset resins by heating with peroxide initiators, or form at lower temperatures similar polymers by copolymerization with styrene or other vinyl type monomers, and these include such compounds as diallyl maleate, diallyl fumarate, diallyl phthalate, diallyl benzene phosphorate, allyl itaconate, methallyl methacrylate, triallyl cyanurate, etc. Therefore the description is merely illustrative of the concept and not intended as limiting thereof, except as set forth in the following claims.

What is claimed is:

1. A process for producing a relatively stress free laminated polarizing optical device, comprising:
   coating a polarizing sheet or film with an adhesive adhering to and chemically compatible with said polarizing sheet or film and adherable to and compatible with an allyl ester convertible to a hard, optically clear thermoset resin;
   positioning said coated polarizing sheet or film in a mold to allow communication for fluids over both sides of said film while in said mold;
   said mold having smooth, optical front and rear surfaces so that said coated polarizing sheet or film is spaced from said front and rear surfaces, said film being closely adjacent one of said surfaces whereby stresses are minimized in devices resulting from cast liquids;
   injecting a liquid allyl ester convertible to a hard resin with a peroxide initiator into said mold so as to completely encase said coated polarizing sheet or film and releasing air from said mold;

curing said allyl ester into a hard resin by heating at a temperature of 30°–100° C. thereby laminating said polarizing sheet or film in said resin, and removing the resultant laminant from said mold.

2. A process according to claim 1 wherein said coating is performed by dipping said polarizing sheet in a liquid polyvinyl butyral.

3. A process according to claim 1 wherein said allyl ester is allyl diglycol carbonate.

4. A process according to claim 1 wherein said coated polarizing sheet includes spacer means secured to the edge thereof whereby said spacer means resting on said front surface of said mold positions said polarizing sheet in said mold.

5. A process according to claim 1 wherein said polarizing sheet includes cut out portions on the peripheral edge thereof forming said means for communication for fluids between said front and rear surfaces.

6. A process according to claim 5 wherein said polarizing sheet includes a pair of cut outs on opposed sides on the periphery of said sheet leaving opposed tabs and openings for communication between the front and rear surfaces of said polarizing sheet.

7. A process according to claim 5 wherein said polarizing sheet includes a pair of opposed cut outs formed by straight cuts extending along chords.

References Cited
UNITED STATES PATENTS

| | | | |
|---|---|---|---|
| 3,607,600 | 9/1971 | Schreter | 264—331 X |
| 3,619,458 | 11/1971 | Engelhardt et al. | 264—328 X |
| 3,424,837 | 1/1969 | Martin | 264—328 X |
| 3,418,978 | 12/1968 | Wise et al. | 264—328 X |
| 2,385,486 | 9/1945 | Bartoe et al. | 264—331 X |
| 3,051,596 | 8/1962 | Baltzer | 161—408 X |
| 3,311,690 | 3/1967 | Fischer | 264—328 X |
| 3,582,424 | 6/1971 | Norvaisa | 156—245 X |

HAROLD ANSHER, Primary Examiner

U.S. Cl. X.R.

156—278; 161—5, 408; 264—328, 331